United States Patent
Lambare et al.

(10) Patent No.: US 9,857,489 B2
(45) Date of Patent: Jan. 2, 2018

(54) SYSTEM AND METHOD FOR RAY BASED TOMOGRAPHY GUIDED BY WAVEFORM INVERSION

(71) Applicant: CGG SERVICES SA, Massy (FR)

(72) Inventors: Gilles Lambare, Saint Fargeau Ponthierry (FR); Thibaut Allemand, Sceaux (FR)

(73) Assignee: CGG SERVICES SAS, Massy (FR)

( * ) Notice: Subject to any disclaimer, the term of this patent is extended or adjusted under 35 U.S.C. 154(b) by 61 days.

(21) Appl. No.: 14/760,731

(22) PCT Filed: Jan. 15, 2014

(86) PCT No.: PCT/EP2014/050724
§ 371 (c)(1),
(2) Date: Jul. 14, 2015

(87) PCT Pub. No.: WO2014/111431
PCT Pub. Date: Jul. 24, 2014

(65) Prior Publication Data
US 2015/0346367 A1 Dec. 3, 2015

Related U.S. Application Data

(60) Provisional application No. 61/752,583, filed on Jan. 15, 2013.

(51) Int. Cl.
*G01V 1/28* (2006.01)
*G01V 1/30* (2006.01)
(52) U.S. Cl.
CPC .............. *G01V 1/303* (2013.01); *G01V 1/282* (2013.01); *G01V 2210/51* (2013.01);
(Continued)

(58) Field of Classification Search
CPC .... G01V 1/303; G01V 1/282; G01V 2210/51; G01V 2210/671; G01V 2210/675; G01V 2210/6222
(Continued)

(56) References Cited

U.S. PATENT DOCUMENTS

| | | | |
|---|---|---|---|
| 5,671,136 A * | 9/1997 | Willhoit, Jr. | G01V 1/30 702/18 |
| 8,612,156 B2 * | 12/2013 | Gulati | G01V 1/28 702/11 |
| 2013/0311149 A1 * | 11/2013 | Tang | G06F 17/50 703/2 |

OTHER PUBLICATIONS

Alaei, "An integrated procedure for migration velocity analysis in complex structures of thrust belts," Journal of Applied Geophysics, Jun. 2006, pp. 89-105, vol. 59, No. 2.
(Continued)

*Primary Examiner* — Daniel L Murphy
(74) *Attorney, Agent, or Firm* — Patent Portfolio Builders PLLC

(57) ABSTRACT

Disclosed herein is a system and method for building a velocity model for a geographical area of interest (GAI). The system and method comprise determining a ray based tomography velocity image of said GAI using acquired data, determining a high resolution velocity guide (HRVG) image of said GAI, scaling said determined HRVG of said GAI, adding the scaled HRVG to the ray based tomography velocity image to determine an updated ray based tomography velocity image, and determining whether said updated ray based tomography velocity image has experienced convergence by determining whether a cost function of said ray based tomography velocity image does not improve compared to a previously determined cost function value of said ray based tomography velocity image.

20 Claims, 8 Drawing Sheets

(52) U.S. Cl.
CPC ............... *G01V 2210/6222* (2013.01); *G01V 2210/671* (2013.01); *G01V 2210/675* (2013.01)

(58) Field of Classification Search
USPC .......................................................... 367/73
See application file for complete search history.

(56) References Cited

OTHER PUBLICATIONS

Alkhlifah, "Tau migration and velocity analysis: Theory and synthetic examples," Geophysics, Jul.-Aug. 2003, pp. 1331-1339, vol. 68, No. 4.
Bakker et al., "Developing angle-domain wave path tomography for velocity analysis in complex settings," 75th EAGE Conference & Exhibition incorporating SPE EUROPEC 2013, Jun. 10-13, 2013, London, UK.
Beylkin et al.,"Linearized Inverse Scattering Problems in Acoustics and Elasticity," Wave Motion, Jan. 1990, pp. 15-52, vol. 12, No. 1.
Chauris et al., "Migration velocity analysis from locally coherent events in 2-D laterally heterogeneous media, Part 1: Theoretical aspects," Geophysics, Jul.-Aug. 2002, pp. 1202-1212, vol. 67, No. 4.
Chauris et al., "Seismic demigration/migration in the curvelet domain," Geophysics, Mar.-Apr. 2008, pp. S35-S46, vol. 73, No. 2.
Ehinger et al., "Velocity model determination by the SMART method, Part 1: Theory," SEG Technical Program Expanded Abstracts, Jan. 1999, vol. 14, No. 1.
Farra et al., "Non-linear reflection tomography," Geophysical Journal, Oct. 1988, pp. 135-147, vol. 95, No. 1.
Fleury et al., "Bi-objective optimization for the inversion of seismic reflection data: Combined FWI and MVA," 2012 SEG Annual Meeting, Nov. 4-9, 2012, Las Vegas, NV, USA.
Gauthier et al., "Two-dimensional nonlinear inversion of seismic waveforms: Numerical results," Geophysics, Jul. 1986, pp. 1387-1403, vol. 51, No. 7.
Guillaume et al., "Kinematic invariants: an efficient and flexible approach for velocity model building," 2008 SEG Annual Meeting, Nov. 9-14, 2008, Las Vegas, NV, USA.
Guillaume et al., "3D finite-offset tomographic inversion of CRP-scan data, with or without anisotropy," SEG Int'l Exposition and Annual Meeting, Sep. 9-14, 2001, San Antonio, TX, USA.
Guillaume et al., "Building Detailed Structurally Conformable Velocity Models with High Definition Tomography," 74th EAGE Conference & Exhibition incorporating SPE EUROPEC 2012, Jun. 4-7, 2012, Copenhagen, DK.
Guillaume et al., "Geologically consistent velocities obtained by High Definition Tomography," 2011 SEG Annual Meeting. Sep. 18-23, 2011, San Antonio, TX, USA.
Hardy, "Ongoing R&D in Ray-based Tomography—Well Worth the Effort," 75th EAGE Conference & Exhibition incorporating SPE EUROPEC 2013, Jun. 10-13, 2013, London, UK.
Holberg et al., "High-definition 3D Anisotropic WEM-tomography," 75th EAGE Conference & Exhibition incorporating SPE EUROPEC 2013, Jun. 10-13, 2013, London, UK.
Jaiswal et al., "Unified imaging of multichannel seismic data: Combining traveltime inversion and prestack depth migration," Geophysics, Sep.-Oct. 2008, pp. VE269-VE280, vol. 73, No. 5.
Jin et al., "Two-dimensional asymptotic iterative elastic inversion," Geophysical Journal International, Feb. 1992, pp. 575-588, vol. 108, No. 2.
Jones, "Tutorial: Velocity estimation via ray-based tomography," First Break, Feb. 2010, pp. 45-52, vol. 28, No. 2.
Lailly, "The Seismic Inverse Problem as a Sequence of Before Stack Migrations," Conference on Inverse Scattering: Theory and Application, 1983, pp. 206-220, SIAM, Philadelphia, PA, USA.
Lambaré et al., "3D ray+Born migration/inversion—Part1: Theory," Geophysics, Jul.-Aug. 2003, pp. 1348-1356, vol. 68, No. 4.
Lambaré et al., "Iterative asymptotic inversion in the acoustic approximation," Geophysics, Sep. 1992, pp. 1138-1154, vol. 57, No. 9.
Lambaré, "Stereotomography," Geophysics, Sep.-Oct. 2008, pp. VE25-VE34, vol. 73, No. 5.
Lambaré et al., "Stereotomography: a semi-automatic approach for velocity macromodel estimation," Geophysical Prospecting, Nov. 2004, pp. 371-381, vol. 52, No. 6.
Lambaré, "Stereotomography: past, present and future," EAGE 66th Conference & Exhibition, Jun. 7-10, 2004, Paris, FR.
Liu, "An analytical approach to migration velocity analysis," Geophysics, Jul.-Aug. 1997, pp. 1238-1249, vol. 62, No. 4.
Miller et al., "A new slant on seismic imaging: Migration and integral geometry," Geophysics, Jul. 1987, pp. 943-964, vol. 52, No. 7.
Mulder et al., "Automatic migration velocity analysis and multiples," SEG Technical Program Expanded Abstracts 2008, SEG 2008 Annual Meeting, Nov. 9-14, 2008, Las Vegas, NV, USA.
Operto et al., "3D ray+Born migration/inversion—Part 2: Application to the SEG/EAGE overthrust experiment," Geophysics, Jul.-Aug. 2003, pp. 1357-1370, vol. 68, No. 4.
Operto et al., "Can we quantitatively image complex structures with rays?" Geophysics, Jul.-Aug. 2000, pp. 1223-1238, vol. 65, No. 4.
Perrone et al., "Wavefield Tomography Based on Local Image Correlations," 75th EAGE Conference & Exhibition incorporating SPE EUROPEC 2013, Jun. 10-13, 2013, London, UK.
Pica et al., "Nonlinear inversion of seismic reflection data in a laterally invariant medium," Geophysics, Mar. 1990, pp. 284-292, vol. 55, No. 3.
Plessix et al., "Application of acoustic full waveform inversion to a low-frequency large-offset land data set," SEG Technical Program Expanded Abstracts 2010, SEG 2010 Annual Meeting, Oct. 17-22, 2010, Denver, CO, USA.
Plessix et al., "Waveform Inversion of Reflection Seismic Data for Kinematic Parameters by Local Optimization," SIAM Journal on Scientific Computing, May 1999, pp. 1033-1052, vol. 20, No. 3.
Pratt et al., "Gauss-Newton and full Newton methods in frequency-space seismic waveform inversion," Geophysical Journal International, May 1998, pp. 341-362, vol. 133, No. 2.
Ravaut et al., "Multiscale imaging of complex structures from multifold wide-aperture seismic data by frequency-domain full-waveform tomography: application to a thrust belt," Dec. 2004, pp. 1032-1056, vol. 159, No. 3.
Shen et al., "Differential semblance velocity analysis by wave-equation migration," SEG Technical Program Expanded Abstracts 2003, pp. 2132-2135.
Sirgue et al., "Efficient waveform inversion and imaging: A strategy for selecting temporal frequencies," Geophysics, Jan.-Feb. 2004, pp. 231-248, vol. 69, No. 1.
Soubaras et al., "Variable-depth streamer acquisition: broadband data for imaging and inversion," SEG Technical Program Expanded Abstracts 2011, SEG 2011 Annual Meeting, Sep. 18-23, 2011, pp. 2364-2368, San Antonio, TX, USA.
Stork, "Reflection tomography in the postmigrated domain," Geophysics, May 1992, pp. 680-692, vol. 57, No. 5.
Symes, "Migration velocity analysis and waveform inversion," Geophysical Prospecting, Nov. 2008, pp. 765-790, vol. 56, No. 6.
Tarantola, "A strategy for nonlinear elastic inversion of seismic reflection data," Geophysics, Oct. 1986, pp. 1893-1903, vol. 51, No. 10.
Tarantola, "Inversion of seismic reflection data in the acoustic approximation," Geophysics, Aug. 1984, pp. 1259-1266, vol. 49, No. 8.
Tarantola, "Linearized Inversion of Seismic Reflection Data," Geophysical Prospecting, Dec. 1984, pp. 998-1015, vol. 32, No. 6.
Thierry et al., "3-D preserved amplitude prestack depth migration on a workstation," Geophysics, Jan.-Feb. 1999, pp. 222-229, vol. 64, No. 1.
Thierry et al., "Fast 2-D ray+Born migration/inversion in complex media," Geophysics, Jan.-Feb. 1999, pp. 162-181, vol. 64, No. 1.

(56) References Cited

OTHER PUBLICATIONS

Vigh et al., "Full-waveform inversion application in different geological settings," SEG Technical Program Expanded Abstracts 2011, SEG 2011 Annual Meeting, Sep. 18-23, 2011, pp. 2374-2378, San Antonio, TX, USA.
Virieux et al., "An overview of full-waveform inversion in exploration geophysics," Geophysics, Nov.-Dec. 2009, pp. WCC127-WCC152, vol. 74, No. 6.
Woodward et al., "A decade of tomography," Geophysics, Sep.-Oct. 2008, pp. VE5-VE11, vol. 73, No. 5.
Woodward et al., "Automated 3D tomographic velocity analysis of residual moveout in prestack depth migrated common image point gathers," SEG Technical Program Expanded Abstracts 1998, SEG 1998 Annual Meeting, Sep. 13-18, 1998, pp. 1218-1221, New Orleans, LA, USA.
Xu et al., "Common-angle migration: A strategy for imaging complex media," Geophysics, Nov.-Dec. 2001, pp. 1877-1894, vol. 66, No. 6.
Xu et al., "Fast migration/inversion with multivalued rayfields: Part 1—Method, validation test, and application in 2D to Marmousi," Geophysics, Sep.-Oct. 2004, pp. 1311-1319, vol. 69, No. 5.
Zelt et al., "Three-dimensional seismic refraction tomography: A comparison of two methods applied to data from the Faeroe Basin," Journal of Geophysical Research, Apr. 10, 1998, pp. 7187-7210, vol. 103, No. B4.
International Search Report and Written Opinion dated Sep. 8, 2014 in related International Application No. PCT/EP2014/050724.
Office Action in corresponding European Application No. 14 700 998.9 dated Apr. 7, 2017.

* cited by examiner

SYSTEM AND METHOD FOR RAY BASED TOMOGRAPHY GUIDED BY WAVEFORM INVERSION

PRIORITY INFORMATION

The present application claims priority under 35 U.S.C. §119(e) to U.S. Provisional Patent Application Ser. No. 61/752,583, filed 15 Jan. 2013, the entire contents of which are expressly incorporated herein by reference.

TECHNICAL FIELD

The present embodiments relate generally to seismic exploration systems and methods, including, for example, land and marine, but not limited particularly thereto, and more specifically to systems and methods for determining a ray based tomography model of a geographical area of interest guided by waveform inversion.

BACKGROUND

Seismic waves generated artificially have been used for more than 50 years to perform imaging of geological layers. During seismic exploration operations, vibrator equipment (also known as a "source") generates a seismic signal that propagates in the form of a wave that is reflected at interfaces of geological layers. These reflected waves are received by geophones, or more generally receivers, which convert the displacement of the ground resulting from the propagation of the waves into an electrical signal which is recorded. Analysis of the arrival times and amplitudes of these waves make it possible to construct a representation of the geological layers on which the waves are reflected.

FIG. 1 depicts schematically a system 100 for transmitting and receiving seismic waves intended for seismic exploration in a marine environment. System 100 comprises a source 118 on a streamer or cable 116a, pulled from ship or boat 102, on the surface 106 of ocean 108 (or other water mass, such as a large lake or river). Source 118 is operable to generate a seismic signal. System 100 further includes a set of receivers 120 (e.g., hydrophones) for receiving a seismic signal and converting it into an electrical signal, also located on streamer 116b, and marine seismic data recording/processing system 126 for recording and processing the electrical signals generated by receivers 120. Streamers 116 can also include birds 122 for guiding and maintaining position of streamers 116. Source 118, receivers 120 can be intermixed on one or more streamers 116, in any order. FIG. 1 depicts source 118 as a single source but it should be understood that the source may be composed of several sources, as is well known to persons skilled in the art. Also part of system 100 are antennas 124 that can be used to transmit information and controls between ships 102, land bases, birds 122 (some birds 122 can also include antennas 122) and other devices.

In operation, source 118 is operated so as to generate a seismic signal. This signal propagates through water 108, in the form of transmitted waves 124 that generate reflected waves 126 when they reach an interface 110 between two layers 108 (ocean) and 112 (a geological layer, in this case, the ocean floor; it can also be appreciated by those of skill in the art that sometimes the transmitted waves 124 travel upwards instead of downwards, and when they reach the interface between atmosphere/air 104 and ocean 108 (i.e., at ocean surface 108) downward reflected waves 126 can also be generated (not shown); these are known by those of skill in the art as "ghosts"). Each receiver 120 receives one or more reflected waves 126 and converts them into an electrical signal. System 100 intends to image the subsurface regions 112 to determine the presence, or not, of hydrocarbon deposit 114.

FIG. 2 depicts schematically a system 200 for transmitting and receiving seismic waves intended for seismic exploration in a land environment. System 200 comprises a source 202 consisting of a vibrator operable to generate a seismic signal, a set of receivers 204 (e.g., geophones) for receiving a seismic signal and converting it into an electrical signal and land seismic data recording/processing system 206 for recording and processing the electrical signals generated by receivers 204. System 200 can further include antennas 124 for communications between vehicles 224a, 224b, receivers 204, and land seismic data recording/processing system 206.

Source 202, receivers 204 and land seismic data recording/processing system 206 (located on vehicle 224b) are positioned on the surface of ground 208. FIG. 2 depicts source 202 as a single vibrator but it should be understood that the source may be composed of several vibrators, as is well known to persons skilled in the art. In operation, source 202 is operated so as to generate a seismic signal. This signal propagates firstly on the surface of the ground, in the form of surface waves 210, and secondly in the subsoil, in the form of transmitted waves 212 that generate reflected waves 214 when they reach an interface 220 between two geological layers. Each receiver 204 receives both surface wave 210 and reflected wave(s) 214 and converts them into an electrical signal, which signal thus includes a component associated with reflected wave 214 and another component associated with surface wave 210. Since system 200 intends to image the subsurface regions 216 and 218, including hydrocarbon deposit 222, the component in the electrical signal associated with surface wave 210 is undesirable and should be filtered out.

Velocity models are key components of seismic imaging, and consequently, to reservoir description and geo-mechanical analysis. As its name implies, a velocity model is a visual representation of the velocity of sound waves in different locations underground. Note that "underground" can mean in land-based areas, for example, within the continental United States, or underground under the ocean floor (but can also include the different velocities of the sound as it passes through different ocean water layers). Thus, as shown in FIG. 3, first transmitted seismic wave 304 can have many different velocities as it travels from source 118, through different water layers 302a-d, through different underground layers 112a-c, and is finally reflected and received by receivers (not shown in FIG. 3). As those of ordinary skill in the art can appreciate, in standard sea water conditions, the first velocity is in the order of about 1,500 meters-per-second (mps). FIG. 3, a greatly oversimplified view of a velocity model for a fictitious area, shows up to seven different velocity-constant layers, all of which are relatively flat. This generally is not the case. For example, in an actual thrust belt, which is a geological formation caused by compressional tectonics, a natural process that ultimately results in the formation of large mountain ranges, the layers would generally not be flat, instead, would be undulating, wave-like in appearance, and even exhibit abrupt "cliff" or vertical separations and other manners of discontinuities. As those of ordinary skill in the art can appreciate, thrust belts present both significant financial rewards as well as financial risk: significant oil and gas deposits can be found around thrust belts, but, not every thrust belt will exhibit the properties of oil and gas deposits, and so "bust" drillings can occur, at the cost of about ten million dollars or so per drilling.

If the sub-strata were more or less homogenous, the velocity model would be relatively easy to create (as shown, for example, in FIG. 3); however, it is known that there are many different geological factors that will make it very difficult to create accurate depictions of the velocity model. For example, some sub-surface areas have significant complex features such as strong velocity or anisotropic parameter variations or complex geological formations such as salt and basalt structures, heavily faulted zones, anisotropic environments due to sedimentation or fracturing (an anisotropic environment is one in which seismic waves move at higher or lower velocities depending upon whether they move in directions along or across rock bed layers), overthrusts, shallow gas, among others. The processing of the reflected and refracted sound waves, therefore, can become extremely complicated.

Those of ordinary skill in the art can appreciate that velocity can vary depending upon such things as lithology (the type of rock), and depth of burial, since rocks under pressure tend to have higher velocity (due, in part, to increasing density). When imaging velocity models following processing of received seismic waves, it is common to use colors, or shading, to represent a rainbow scale of rock velocity. Thus, similarly colored areas exhibit similar velocities. According to one non-limiting example, a first color or colors—purples and/or blues—represent the lower velocities in the range of 3,000 to 3,500 meters per second. A third set of colors—reds, yellows and oranges—represent velocities that are about 6,000 meters per second. A second set of colors, for example green, represents velocities that are in the range of about 4,000-5,000 meters per second. As discussed above, seismic data is obtained by generating sound waves, and locating receivers, usually a large number of them (in the order of several hundred to several thousand depending on the location and the expected underground geological topology), to collect the data.

Inversion processes, or more formally known as the field of inverse theory, as known to those of skill in the art, deals with the mathematics of describing an object based on measurements or observations that are associated with that object. For example, knowing what signals enters a black box, and knowing the signals that exit it, one might be able to discern, for that input alone, what type of processing occurs within the black box. In the world of seismic study, tomography is a specific type of inversion process. A formal description of this process was given by Backus and Gilbert (1968) in the context of inverse theory applied to geophysical observations. In most real-world situations, however, there is never a sufficient amount of observed data to determine a unique solution, and the data that is available may be noisy and/or unreliable. In the case of travel time measurements made in a surface seismic experiment, there exists the specific inverse problem of trying to determine the velocity structure of the earth.

In regard to tomography and the context of seismic imaging and velocity model building, construction of an estimate of the subsurface velocity distribution occurs based on a series of measurements of travel times or amplitudes associated with seismic reflections, transmissions, and/or refractions, perhaps including some geological constraints. This includes information determined prior to migration (in the data domain) and also after completion of a migration in the migrated (image) domain. Within each of these domains, there is arrival time or depth (kinematic) information as well as amplitude and wavelet (dynamic) information. Therefore, there are at least four basic classes of observables we could use to solve the tomographic inverse problem. To simplify the procedure, travel time information alone can be used, or migrated depth information alone, or, more completely, the measured amplitudes of the waveforms of the recorded data including the associated arrival times and wavelets can be used.

Tomography based on ray tracing can be formulated for reflection, transmission, and refraction. Several techniques for computing statics corrections in seismic reflection surveys make use of refraction tomography, whilst transmission tomography is used for cross-well applications where both the source and the receiver are inside the medium (within boreholes, for example) and also for velocity seismic profiling (VSP) walk-away studies. A vertical seismic profile is a technique of seismic measurements generally used for correlation with surface seismic data. Generally speaking, the defining characteristic of a VSP is that either the energy source, or the detectors, or sometimes both, are in a borehole. As a result, there is access to, and can be made use of, transmitted arrival information. Exploiting amplitude information in addition to arrival times can further assist ray-based tomography in estimating a reliable velocity model. In addition to velocity estimation, tomography can be used to estimate other earth parameters, such as absorption.

Accordingly, full waveform inversion (FWI) has been an important method to build velocity models for seismic imaging (see, Tarantola, A., 1984, Inversion of Seismic Reflection Data in the Acoustic Approximation: Geophysics," 49, 1259-1266; and Sirgue, L., and R. G. Pratt, 2004, "Efficient Waveform Inversion and Imaging: A strategy for Selecting Temporal Frequencies," Geophysics, 69, 231-248.; and Virieux, J., and S. Operto, 2009, "An Overview of Full Waveform Inversion in Exploration Geophysics," Geophysics, 74(6), WCC127-WCC152, the entire contents of each of which are incorporated herein in their entirety). Classical FWI involves the minimization of a square misfit function between the calculated and observed data. Non-linear gradient based optimizations have also been used (see, Pratt, R., C. et al., 1998, "Gauss-Newton and Full Newton Methods in Frequency-Space Seismic Waveform Inversion," Geophysical Journal, International, 13, p. 341-362; Ravaut, C. et al., 2004, "Multi-scale Imaging of Complex Structures from Multifold Wide-Aperture Seismic Data by Frequency-Domain Full Waveform Tomography: Application to a Thrust Belt," Geophysical Journal, International, 159, 3, p. 1032-1056; Sirgue, L., and R. G. Pratt, 2004, "Efficient waveform inversion and imaging: A Strategy for Selecting Temporal Frequencies," Geophysics, 69, 231-248; Choi et al., 2008; Ma and Hale, 2011) with complex strategies for making the results more linear (filtering, weighting, and muting of the data, among other data manipulations). These strategies mitigate non-linearity but cannot recover the features that are not covered by the intrinsic resolution of the method.

Velocity model building, therefore, is a significant step in seismic depth imaging for both land and marine seismic imaging. As those of ordinary skill in the art can appreciate, in order to provide a representative image of the geographical area of interest (GAI), i.e., in order to properly interpret the seismic waves to provide accurate seismic images, it is necessary to have a well-defined velocity model of the general area. However, compared to conventional velocity model building methods based on picking (see, Stork, C., 1992, "Reflection Tomography in the Post-Migrated Domain," Geophysics, 57, 5, 680-692; Liu, Z., 1997, "An Analytical Approach to Migration Velocity Analysis," Geophysics, 62, 4, 1238-1249; Woodward, M., et al., 1998, "Automated 3D Tomographic Velocity Analysis of Residual Moveout in Prestack Depth Migrated Common Image Point Gathers," SEG, Expanded Abstracts, 17, 1, 1218-1221; Guillaume, P., et al., 2001, "3D Finite-Offset Tomographic Inversion of CRP-Scan Data, With or Without Anisotropy," SEG, Expanded Abstracts, 20, no. 1, 718-721; Woodward, M., et al., 2008, "A Decade of Tomography," Geophysics, 73, 5, VE5-VE11; Guillaume, P., et al., 2008, "Kinematic Invariants: An Efficient and Flexible Approach for Velocity Model Building," SEG, Expanded Abstracts, 27, no. 1, 3687-3692), full wave form inversion (FWI) (see, Virieux, J., et al., 2009, "An Overview of Full Waveform Inversion in Exploration Geophysics," Geophysics, 64, WCC1-WCC26) is appreciated for providing high resolution and structurally conformable velocity models (i.e., a velocity model that accurately conforms with, or resembles, the actual structure of the layers below ground). The resulting velocity models are, however, generally only trustworthy for the high resolution velocity structures of the near surface investigated by diving waves.

Thus, there are certain problems with determining accurate velocity models using current methods and system, especially when the velocity models are developed for areas other than near surface, and especially when using anything other than full wave form inversion. Accordingly, it would be desirable to provide methods, modes and systems for using a ray based tomography process to develop enhanced velocity models for geographical areas of interest.

SUMMARY

An aspect of the embodiments is to substantially solve at least one or more of the problems and/or disadvantages discussed above, and to provide at least one or more of the advantages described below.

It is therefore a general aspect of the embodiments to provide marine seismic exploration systems and methods for determining a ray based tomography model of a geographical area of interest guided by waveform inversion that will obviate or minimize problems of the type previously described.

According to a first aspect of the embodiments, a method for building a velocity model for a geographical area of interest (GAI) is provided comprising determining a ray based tomography velocity image of said GAI using acquired data, determining a high resolution velocity guide (HRVG) image of said GAI, scaling said determined HRVG of said GAI, adding the scaled HRVG to the ray based tomography velocity image to determine an updated ray based tomography velocity image, and determining whether said updated ray based tomography velocity image has experienced convergence by determining whether a cost function of said ray based tomography velocity image does not improve compared to a previously determined cost function value of said ray based tomography velocity image.

According to a second aspect of the embodiments, a method for building a velocity model for a geographical area of interest (GAI) is provided comprising guiding a ray-based tomography method to build the velocity model of the GAI by high resolution velocity perturbations (HRVPs), wherein said HRVPs are derived from at least one of a depth migration process and a full waveform inversion process, and wherein said velocity model is a focused ray based tomography velocity model.

According to a third aspect of the embodiments, a non-transitory computer readable medium of instructions for building a velocity model for a geographical area of interest (GAI) is provided comprising a first set of instruction adapted to use acquired seismic data corresponding to at least one of direct and reflected waves to build a first velocity model of the GAI using a ray based tomography method, and a second set of instruction adapted to adjust the ray based tomography velocity model of the GAI using high resolution velocity perturbations to obtain a focused ray based tomography first velocity model.

BRIEF DESCRIPTION OF THE DRAWINGS

The above and other aspects of the embodiments will become apparent and more readily appreciated from the following description of the embodiments with reference to the following figures, wherein like reference numerals refer to like parts throughout the various figures unless otherwise specified, and wherein.

DETAILED DESCRIPTION

Figure 1:
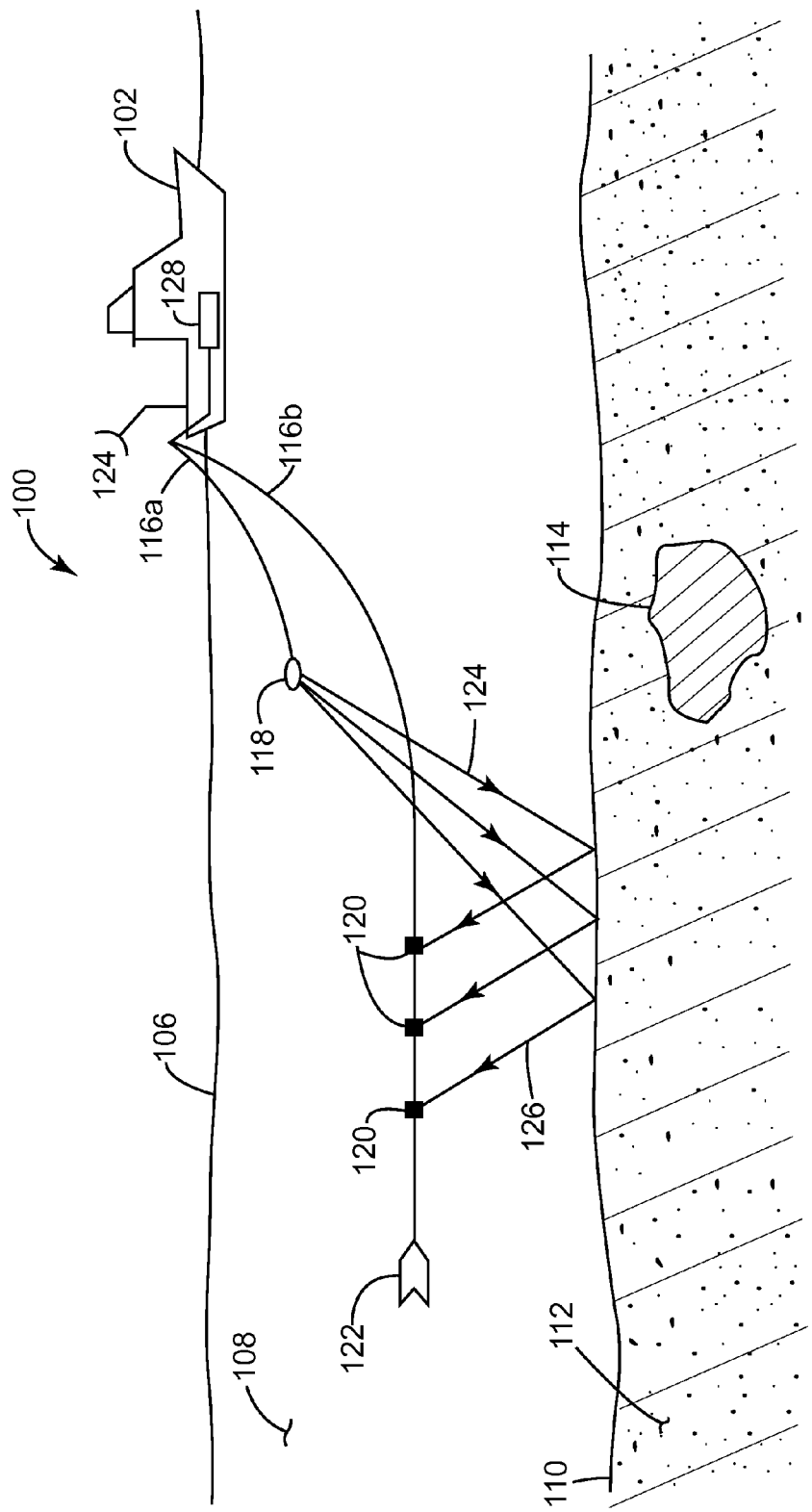
FIG. 1 illustrates a side view of a marine seismic exploration system for use in an underwater seismic gathering process.
Figure 2:
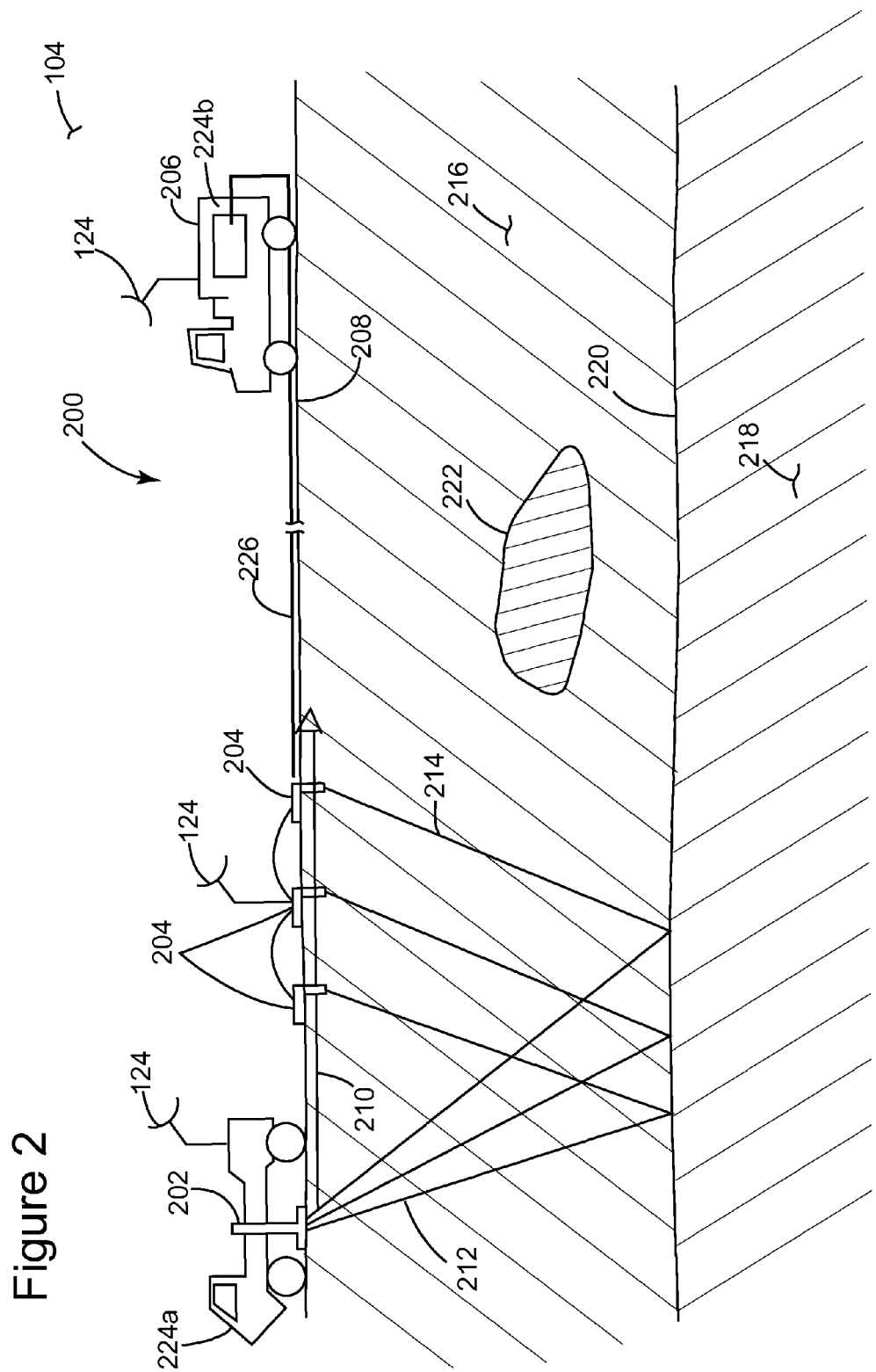
FIG. 2 illustrates a side view of a land seismic exploration system.
Figure 3:
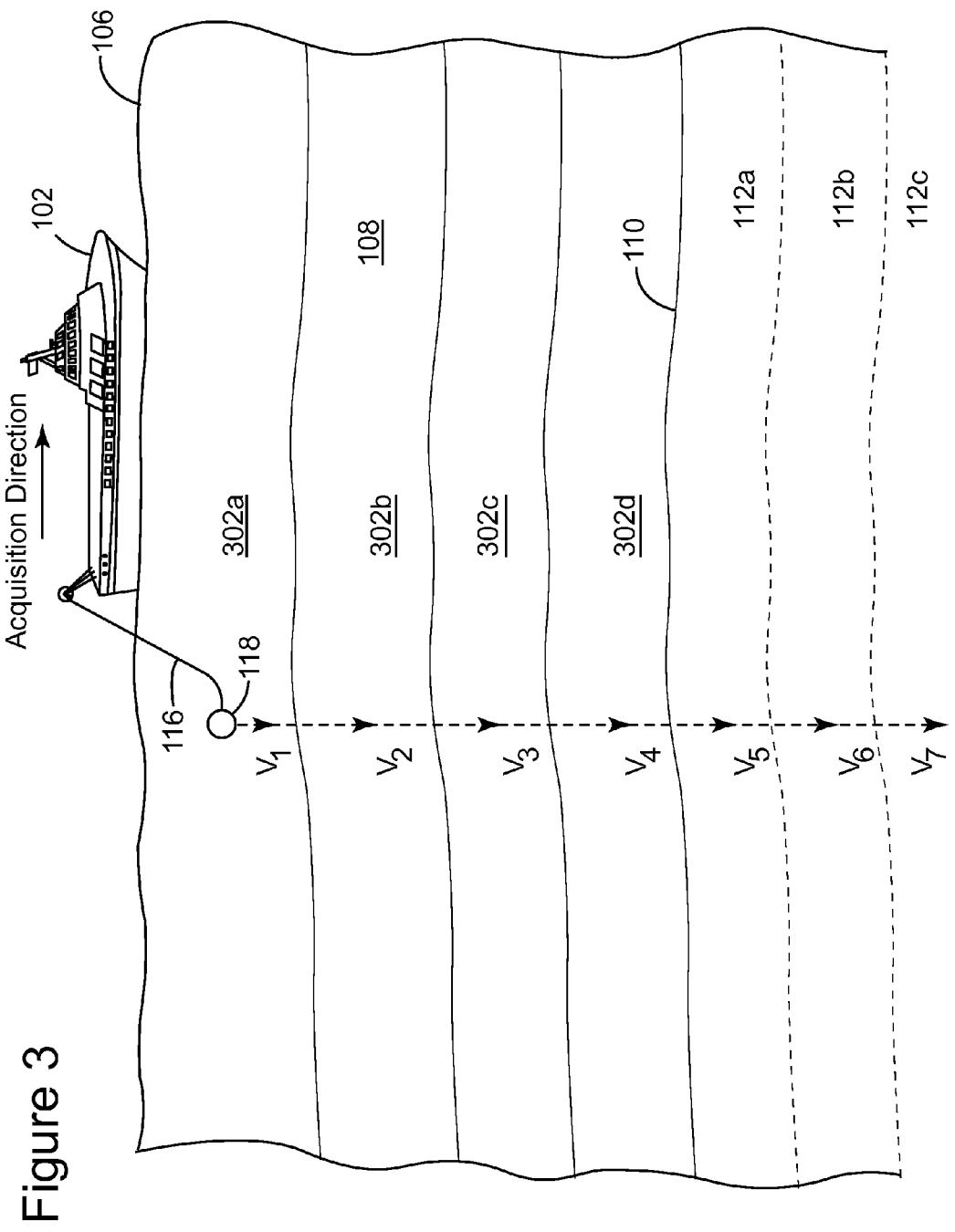
FIG. 3 illustrates a series of velocity layers in both an underwater environment, and an underground (underwater) environment.

The concepts associated with these embodiments are described more fully hereinafter with reference to the accompanying drawings, in which embodiments are shown. In the drawings, the size and relative sizes of layers and regions may be exaggerated for clarity. Like numbers refer to like elements throughout. These concepts may, however, be embodied in many different forms and should not be construed as limited to the embodiments set forth herein. Rather, these embodiments are provided so that this disclosure will be complete, and will convey the scope of these concepts to those skilled in the art. The scope of the embodiments is therefore defined by the appended claims. The following embodiments are discussed, for simplicity, with regard to a method for building a velocity model for a geographical area of interest based on a ray based tomography velocity image and a subsequently developed high resolution velocity guide for the acquisition of marine based seismic data. However, the embodiments to be discussed next are not limited to marine based seismic acquisition, but may be applied to other systems that conventionally involve tomography and velocity guides of acquired seismic data.

According to embodiments, the problems described above can be addressed by, for example, determining a ray based tomography velocity image of the GAI using acquired data, then determining a high resolution velocity guide (HRVG) image of the GAI. Scaling then occurs of the determined HRVG of the GAI, and the scaled HRVG is added back to the ray based tomography velocity image to determine an updated ray based tomography velocity image. Following determination of the updated tomography image, it is determined whether the updated ray based tomography velocity image has experienced convergence by determining whether the cost function of ray based tomography does not improve compared to the value of the previous iteration. According to further embodiments, the step of determining an HRVG comprises using one of a final or intermediate result of full waveform inversion method, a final or intermediate result from linearized seismic inversion method, and a final or intermediate result from a pre-stack depth migration (PreSDM) following correction of reflectivity-to-velocity perturbation method.

Reference throughout the specification to "one embodiment" or "an embodiment" means that a particular feature, structure, or characteristic described in connection with an embodiment is included in at least one embodiment of the embodiments. Thus, the appearance of the phrases "in one embodiment" on "in an embodiment" in various places throughout the specification is not necessarily referring to the same embodiment. Further, the particular feature, structures, or characteristics may be combined in any suitable manner in one or more embodiments.

Figure 4:
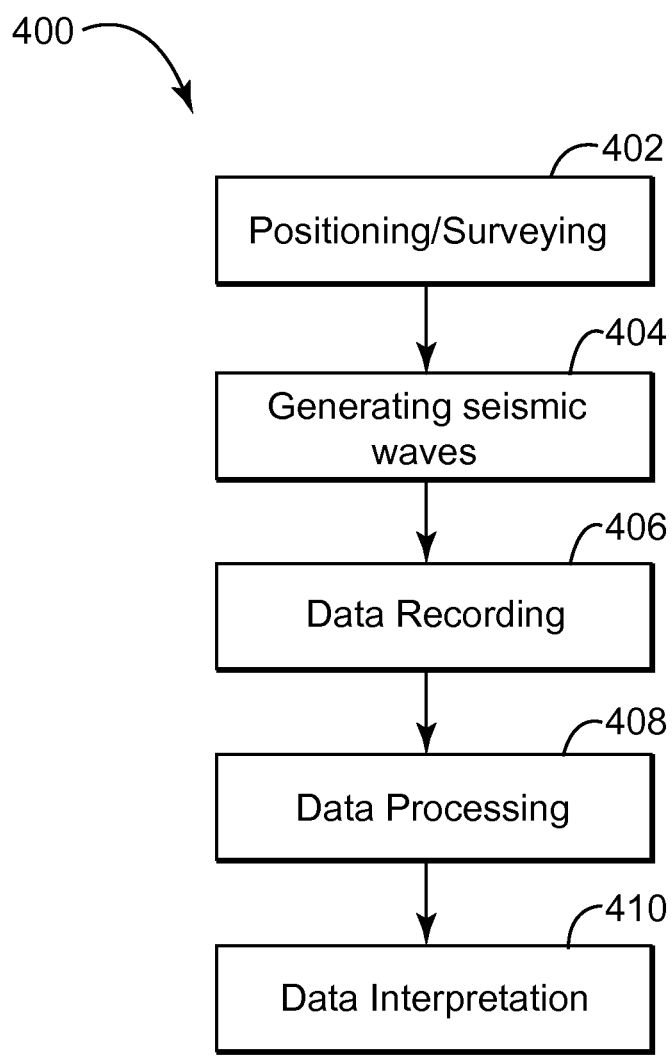
FIG. 4 illustrates a general method for seismic exploration according to an embodiment.

As generally discussed above, the main purpose of seismic exploration is to render the most accurate possible graphic representation of specific portions of the Earth's subsurface geologic structure (also referred to as a GAI). The images produced allow exploration companies to accurately and cost-effectively evaluate a promising target (prospect) for its oil and gas yielding potential (i.e., hydrocarbon deposits 114). FIG. 4 illustrates a general method for seismic exploration (method 400). There are five main steps: a detailed discussion of any one of the process steps would far exceed the scope of this document, but a general overview of the process should aid in understanding where the different aspects of the embodiments can be used. Step 402 of method 400 involves positioning and surveying of the potential site for seismic exploration. In step 404, a determination of what type of seismic energy source should be used, and then causing seismic signals to be transmitted. While method 400 applies equally to both marine and land seismic exploration systems, each will use different types of equipment, especially in generating seismic signals that are used to develop data about the Earth's subsurface geologic structure. In step 406, data recording occurs. In a first part of this step, receivers 120, 204 receive and most often digitize the data, and in a second part of the step 406, the data is transferred to a recording station. In step 408, data processing occurs. Data processing generally involves enormous amounts of computer processing resources, including the storage of vast amounts of data, multiple processors or computers running in parallel. Finally, in step 410, data interpretation occurs and results can be displayed, sometimes in two-dimensional form, more often now in three dimensional form. Four dimensional data presentations (a 3D plot or graph, over time (the fourth dimension) are also possible, when needed to track the effects of other processes, for example.

As discussed briefly above, conventional full wave form inversion (FWI) as compared to velocity model building methods based on picking provides both high resolution and structurally conforming models. But, the resulting velocity building models can only be trusted for high resolution velocity models in near surface areas investigated by diving waves. On the contrary velocity model building methods based on picking of reflected arrivals can recover velocity models in areas only investigated by reflected waves but with less resolution and less structural conformity. (see, Stork 1992; Liu 1997; Woodward 1998; Guillaume et al. 2001, Woodward 2008; and Guillaume et al. 2008)

To solve these issues, an iterative approach for velocity model building is provided according to an embodiment, wherein a ray based tomography process, using diving and/or reflected arrival picks, is guided by the high resolution velocity perturbations derived from depth migration or full waveform inversion or any other a priori information. According to a further embodiment, the guidance provided by the depth migrations or FWI is possible because there is an overlapping between the wavelengths of the velocity model that can be resolved from migration (or FWI) and those that can be resolved from ray based tomography. It exists in the shallow area investigated by diving waves, due, in part, to the wide angular apertures, and exists also in deeper areas in case of broadband data (frequencies down to 2.5 Hz), due, in part, to the kinematics of reflected waves that can provide a vertical resolution up to 6 Hz (see, Guillaume, P., et al., 2012, "Building Detailed Structurally Conformable Velocity Models with High Definition Tomography," EAGE extended abstract, W002, Hardy, P., 2013. Ongoing R&D in Ray-based Tomography—Well Worth the Effort, 75th EAGE Conference & Exhibition—Workshops "Wave Equation Migration Velocity Analysis").

As known by those of skill in the art, tomography is the study of the internal properties of a body by observing the behaviour of rays (or waves) passing through the body. Seismic tomography uses mathematical modelling of wave travel times (or other kinematic attributes or waves) to map velocity perturbations in the interior of the Earth, whether under the ocean floor (or other body of water), or under dry earth. The primary energy source used in global seismic tomography is seismic waves generated by sources, as discussed generally above. Arrival time information can be used (inverted) to determine the speed of the waves at any given point in the GAI. Using seismic ray based tomography to interpret the internal structure of the Earth is similar in technique to a CAT-scan. However, there are significant differences between CAT-scans and seismic tomography, because X-rays travel in straight paths, whereas the ray paths of sound waves bend with changes in the velocity structure of the medium (i.e., refracted or "diving" waves).

Figure 5:
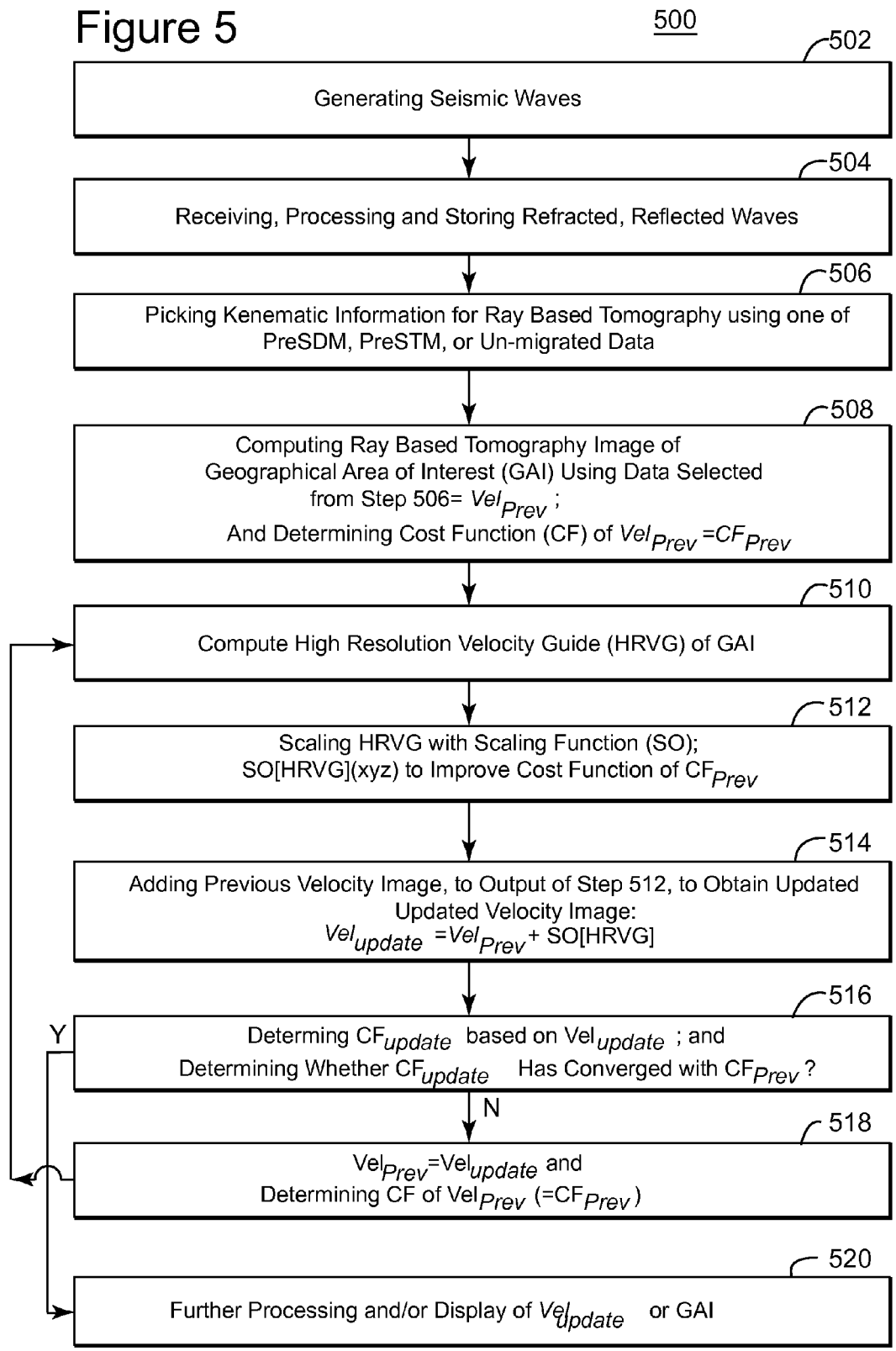
FIG. 5 illustrates a flow chart of a method for determining a ray based tomography velocity model using iterated depth migrations to adjust the velocity model according to an embodiment.

An exemplary high resolution ray based tomography velocity model creation process is discussed with reference to FIG. 5. This high resolution ray based tomography velocity model creation process according to an embodiment is not meant to be construed in a limiting fashion nor is it to suggest that all of the embodiments should be implemented following this process. The purpose of the following high resolution ray based tomography velocity model process is to facilitate the understanding of an embodiment and to provide the reader with one of many possible implementations of the processes described herein. FIG. 5 shows a flow chart illustrating various steps performed during the high resolution ray based tomography velocity model creation process. The steps shown in FIG. 5 are not intended to completely describe the high resolution ray based tomography velocity model creation process but only to illustrate some of the aspects discussed herein.

Attention is directed towards FIG. 5, which illustrates a flow chart of method 500 for determining a high resolution ray based tomography velocity model using iterated depth migrations (or FWI) to adjust the high resolution ray based tomography velocity model according to an embodiment. Method 500 for determining the ray based tomography velocity model begins with step 502, wherein seismic waves (marine or land) are generated by sources 118, 202. In step 504, reflected waves, some primary and some as a result of multiples, and in the case of land seismic exploration, ground waves, are acquired by receivers 120, 204, processed, and stored in marine system 100/land system 200, both of which are described in greater detail below.

The stored data is then reviewed, and data is picked in step 506. In step 506, kinematic information for the ray based tomography process is picked using one of pre-stack depth migration (PreSDM), pre-stack time migration (PreSTM), or un-migrated data.

As discussed above, according to an embodiment, method 500 involves an iterative approach, which is described in greater detail below. Method 500 determines or computes a ray based tomography image of a GAI in step 508, using kinematic information selected from one of PreSDM, PreSTM, or un-migrated data. According to an embodiment, determination of the ray based tomography image occurs according to the process of any type of linear or non-linear ray based tomographic tool, such as first arrival travel-time tomography (see, Zelt, C. A., et al., 1998, "Three-Dimensional Seismic Refraction Tomography: A Comparison of Two Methods Applied to Data from the Faeroe Basin," Journal Geophys. Res., 103(B4):7187-7210); linear migration velocity analysis (see, Woodward, M., et al., 2008, "A Decade of Tomography," Geophysics, 73, 5, VE5-VE11); non-linear slope tomography (see, Lambaré, G., 2008, "Stereo-tomography," Geophysics, 73, 5, VE25-VE34); and travel time tomography (see, Farra, V., et al., 1988, "Nonlinear Reflection Tomography," Geophysical Journal, 95, 135-147). In all these approaches, the ray based tomography velocity model is updated from kinematic information as described above. According to a further embodiment, the kinematic information can be a travel time (as described in the Farra et al. article, 1988) or migrated surface (see, Ehinger, A., et al, 1995, "Velocity Model Determination by the SMART Method, Part 1: Theory," SEG Expanded Abstract, 739-742), or involve kinematic attributes of a locally coherent event (see, Lambaré, G., 2008, "Stereo-tomography," Geophysics, 73, 5, VE25-VE34).

The data selected in step 506, referred to as picked tomographic data, is used in the computation of the ray based tomography image in step 508, through the optimization of a cost function relevant for the quality of the velocity model (in one non-limiting example, a misfit calculation determined between computed and observed travel times in travel time tomography (see, Farra et al., 1988), or the misfit calculation determined between computed and observed slope (see, Chauris, H., et al., 2002, "Migration Velocity Analysis from Locally Coherent Events in 2-D Laterally Heterogeneous Media, Part I: Theoretical Aspects," Geophysics, 67, 4, p. 1202-1212). The ray based tomography image of step 508 can also be referred to as the reference velocity image, or $Vel_{ref}$. Optimization of the cost function, CF, within the scope of embodiments of method 500 is discussed in greater detail below with respect to step 516.

In step 510, a determination or computation of a high resolution guide for the velocity perturbation (the high resolution velocity guide, of "HRVG") of the GAI, based on the acquired data from method step 504 is made. In developing an improved velocity model using ray based tomography guided by waveform inversion, a high resolution velocity guide model is obtained from the traces, according to an embodiment, through at least one of a final or intermediate result from FWI, a final or intermediate result from linearized seismic inversion, a final or intermediate result from PreSDM, and any other information derived from seismic imaging and/or geological interpretation.

According to an embodiment, a first method for determining an HRVG in step 510 is through a final or intermediate result of full waveform inversion as described, for example, in Pica, A., et al., 1990, "Nonlinear Inversion of Seismic Reflection Data in a Laterally Invariant Medium," Geophysics, 55, 3, 284-292, and also in Virieux J. et al, 2009, "An Overview of Full-waveform Inversion in Exploration Geophysics," Geophysics, 74, 6, p. WCC1-WCC26. In the full waveform inversion method for determining an HRVG, an initial model can be iteratively updated using a gradient method (for example a conjugate gradient method). At each iteration the direction of the model perturbation is computed from a weighted and filtered version of the gradient of the cost function consisting of the zero time lag cross-correlation of the forward propagated wave from the sources and the reverse-time propagated residuals (misfit between the data and the synthetics) from the receivers. An extra forward propagation may be required to compute the amplitude of the velocity perturbation along the direction of the model perturbation. Pica's method uses a conventional velocity analysis to derive an initial velocity model, and the application of Pica's method was shown on a real marine data set. According to a further embodiment, while in some cases linearized inversion provides a satisfactory guide, it does occur that in several applications that it relies on a set of approximations that may not always be satisfied, and therefore, its implementations can be limited.

According to an embodiment, a second method for determining an HRVG in step 510 is through any final or intermediate result from linearized seismic inversion (see, Lailly, P., 1984, "The Seismic Inverse Problem as a Sequence of Before Stack Migrations," Conference on Inverse Scattering, Tulsa, Okla.: Philadelphia, SIAM; Tarantola, A., 1984a, "Inversion of Seismic Reflection Data in the Acoustic Approximation," Geophysics, 49, 8, 1259-1266; Tarantola, A., 1984b, "Linearized Inversion of Seismic Reflection Data," Geophysical Prospecting, 32, 6, 998-1015; Miller, D., et al., 1987, "A New Slant on Seismic Imaging: Migration and Integral Geometry," Geophysics, 52, 943-964; Beylkin, G., at al., 1990, "Linearized Inverse Scattering Problems in Acoustics and Elasticity," Wave Motion, 12, 15-52; Lambaré, G., et al., 1992, "Iterative Asymptotic Inversion in the Acoustic Approximation," Geophysics, 57, 1138-1154; Jin, S., et al., 1992, "Two Dimensional Asymptotic Iterative Elastic Inversion," Geophys. J. Internat., 108, 575-588; Thierry P., et al., 1999, "Fast 2-D Ray+Born Migration/Inversion in Complex Media," Geophysics, 64, 1, p. 162-181; Thierry P., et al., 1999, Three-dimensional Preserved Amplitude Prestack Depth Migration on a Workstation," Geophysics, 64, 222-229; Operto, S., et al., 2000, "Can We Quantitatively Image Complex Structures with Rays?" Geophysics, Vol. 65, No. 4, pages 1223-1238; Xu, S., et al., 2001, "Common Angle Migration: A Strategy for Imaging Complex Media," Geophysics, Vol. 66, No. 6, pages 1877-1894; Operto, S., et al., 2003, "3D ray-Born Migration/Inversion—Part 2: Case Study of the SEG/EAGE Overthrust Experiment," Geophysics, Vol. 68, No. 4, pages 1357-1370; Lambaré, G., et al., 2003, "3D ray-Born Migration/Inversion—Part 1: Theory," Geophysics, Vol. 68, No. 4, pages 1348-1354; Xu, S., et al., 2004, "Fast Migration/Inversion with Multi-valued Ray Fields, Part I: Method, Validation Tests and Application to 2D Marmousi," Geophysics, Vol. 69, No. 5, pages 1311-1319; and Lambaré, G., et al., 2004, "Stereotomography: A Semi-automatic Approach for Velocity Macromodel Estimation," Geophysical Prospecting, Vol. 52, pages 671-681). As those of skill in the art can appreciate, linearized inversion is an iterative process that requires various types of regularization. Intermediate results refer to this and also to substantially all of the possibilities available to clean/update these images to create the velocity guide. According to an embodiment, the best velocity guide should be the one that allows for the best improvement of the ray based tomography cost function and provides, at the end of the process, the most accurate velocity model. According to a further embodiment, while in some cases linearized inversion provides a satisfactory guide, it does occur that in several applications that it relies on a set of approximations that may not always be satisfied, and therefore, its implementations can be limited.

According to a further embodiment, a third method for determining an HRVG in step 510 is through any final or intermediate result from stratigraphic inversion from PreSTM or PreSDM after reflectivity-to-velocity-density inversion has been implemented. (see, Soubaras, R., et al., 2011, "Variable-Depth Streamer Acquisition: Broadband Data for Imaging and Inversion," SEG, Expanded Abstracts, 30, 1, 2364-2368).

According to a further embodiment, a fourth method for determining an HRVG in step 510 is through any determination derived from seismic imaging and/or geological interpretation and/or well information (for example the location of a sharp velocity contrast observed at a well or some knowledge about the velocity distribution within a layer and their lateral extrapolation according to some guess about the geological structures).

Method 500 then proceeds to step 512, wherein scaling of the HRVG occurs to determine an updated velocity model. According to an embodiment, scaling is the process of applying to the HRVG, which is a function of space HRVG (x,y,z), a scaling operator SO, where we have the velocity perturbation $\Delta v(x,y,z)=SO[HRVG](x,y,z)$. This scaling operator depends on a limited number of parameters to be determined by an optimization process in such a way that the cost function of the ray based tomography for $v(x,y,z)+\Delta v(x,y,z)$ is improved for the kinematic information used for computing the reference velocity model. This optimization process can be done in a manual way, an automated one, or some combination of both.

As those of skill in the art can appreciate, many types of scaling operators exist. According to an embodiment, the parameters of the scaling operator are selected such that when it is applied against the HRVG, the cost function of the ray based tomography is improved. There are many possibilities for the scaling operator. The simplest one is the application of a scaling factor SO:

$$SO[HRVG](xyz)=SF(xyz) \times HRVG(xyz) \quad (1),$$

wherein SF(x,y,z) is a smoothing scaling factor parameterized by a limited set of parameters. More complex operators can be proposed taking into account the non-linear behaviour of the tomographic update (according to an embodiment, the guide should evolve during the tomographic update). Among the possibilities of complex operators is to perform the addition of the velocity perturbation in the vertical two-way time domain, ti, rather than in the depth domain. According to a further embodiment, therefore, $$\Delta v(xyz)=SF(xyzv_0+\Delta v(\tau v_0(z))) \times HRVG(xyzv_0+\Delta v(\tau v_0(z))) \quad (2),$$

where v0 is $Vel_{prev}$, and SF(x,y,z) is a smooth scaling factor while $$z_{v0+\Delta v}(\tau) = \int_0^\tau d\tau' \left[ \frac{v_0(xyt') + \Delta v(x, y, \tau')}{2} \right], \quad (3)$$

is the depth converted from vertical two-way time velocity profile $v0(xy\tau)+\Delta v(xy\tau)$ and $\tau_{v0}(z)=\int_0^z dz' 2/v0(z')$ is the two way time converted from depth velocity profile v0(x,y,z). One further example according to an embodiment is the use of a de-migration/migration process for the addition of the velocity perturbation:

$$\Delta v(xyz)=Migv_0+\Delta v[Demigv_0[SF(xyz) \times HRVG(xyz)]] \quad (4).$$

According to a further embodiment, a curvelet based de-migration/migration process can also be used (see, Chauris, H. et al., 2008, "Seismic De-migration/Migration in the Curvelet Domain," Geophysics, 73(2), S35-S46). According to still further embodiments, the use of other types of de-migration/migration algorithms is also possible.

Following scaling of the HRVG in method step 512, method 500 proceeds to step 514 wherein the scaled HRVG is added to the previous velocity image ($Vel_{Prev}$) to form an updated velocity image ($Vel_{Update}$). Thus, $Vel_{Update}=Vel_{Prev}+SO[HRVG](xyz)$. In step 516 of method 500, the cost function of the updated velocity image is compared to the cost function of the previous velocity image. If the updated velocity image is satisfactory, i.e. the ray based tomography cost function of the current velocity image ($CF_{New}$) does not improve with respect to the cost function of the previous velocity image ($CF_{Old}$), a process referred to as convergence, determination of the velocity image according to method 500 is essentially complete ("Yes" path from decision step 516), and method 500 continues to step 520, wherein further processing and/or display of the updated velocity image occurs. If the cost function of the current (i.e., updated) velocity image has not improved over the cost function of the previous velocity image ("No" path from decision step 516), method 500 proceeds to step 510 to iterate the process.

As discussed above, when convergence is established ("Yes" path from decision step 516), method 500 proceeds to step 522 wherein additional processing and/or display of the $Vel_{Update}$ image data occurs. Convergence is obtained when the cost function of ray based tomography does not improve compared to the value of the previous iteration, which implies a focusing of the pre-stack depth migrated images. It is the updated velocity image that is output to step 522.

According to a further embodiment, other type of velocity parameters can be considered within the waveform guided ray based tomography process. Any type of parameter allowing to describe the velocity or attenuation in a general visco-elastic media (P and S waves velocities, anisotropic parameters ($\delta$, $\epsilon$, among others), among others) can be considered. Similar strategies apply for the determination of the guide, which can be built from at least one of a final or intermediate result from mono or multi-parameter FWI (see, Virieux, J. et al., "An Overview of Full-waveform Inversion in Exploration Geophysics," Geophysics, 74, 6, p. WCC1-

WCC26), a final or intermediate result from mono- or multi-parameter linearized seismic inversion (see, Tarantola, A., 1986, "A Strategy for Nonlinear Inversion of Seismic Reflection Data," Geophysics, 51, 1893-1903; and Jin S., et al., 1992, "Two-dimensional Asymptotic Iterative Elastic Inversion," Geophys. J. Int., 108, 575-588), a final or intermediate result from PreSDM, and any guess derived from seismic imaging and/or geological interpretation.

According to a further embodiment, ray based tomography can be replaced in the process by waveform tomography with or without picking (see, for example Bakker, P., et al., 2013, "Developing Angle-domain Wave Path Tomography for Velocity Analysis in Complex Settings," 75th EAGE Conference & Exhibition—Workshops, WS06—Wave Equation Migration Velocity Analysis, F02; Symes, W., 2009, "Migration Velocity Analysis and Waveform Inversion," Geophysical Prospecting, 56, 765-790; Shen, P., et al., 2003, "Differential Semblance Velocity Analysis by Wave Equation Migration," SEG Technical Program, Expanded Abstracts, 22(1), 2132-2135; Mulder, W. A., et al., 2008, "Automatic Velocity Analysis and Multiples,"78th Annual International Meeting, Expanded Abstracts, 3128-3132, Society of Exploration Geophysicists; Plessix, R.-E., et al., 1999, "Waveform Inversion of Reflections Seismic Data for Kinematic Parameters by Local Optimization," SIAM Journal on Scientific Computation, 20, 1033-1052; Perrone, F., et al., 2013, "Wavefield Tomography Based on Local Image Correlations," 75th EAGE Conference & Exhibition—Workshops, WS06—Wave Equation Migration Velocity Analysis, F07; and Holberg, O., et al., 2013, "High-definition 3D Anisotropic WEM-tomography," 75th EAGE Conference & Exhibition—Workshops, WS06—Wave Equation Migration Velocity Analysis, F08). In this process, according to an embodiment, the ray based tomography cost function is replaced by the waveform tomography cost function.

According to a further embodiment, further pre-processing of the data selected in method step 506 can occur in which low-pass filtering, muting, and offset ranges are applied to the collected data. According to a further embodiment, any one of these additional pre-processing steps, or in any combination, can be included prior to determination of the HRVG in step 510. Still further according to an embodiment, method 500 can include further processing including the development or computation of an alternate velocity model (in addition to the HRVG determined in method step 510), wherein high frequency components are preserved. According to a further embodiment, these ancillary or auxiliary velocity models can be used by method 500 if external knowledge was available regarding them.

Figure 6:
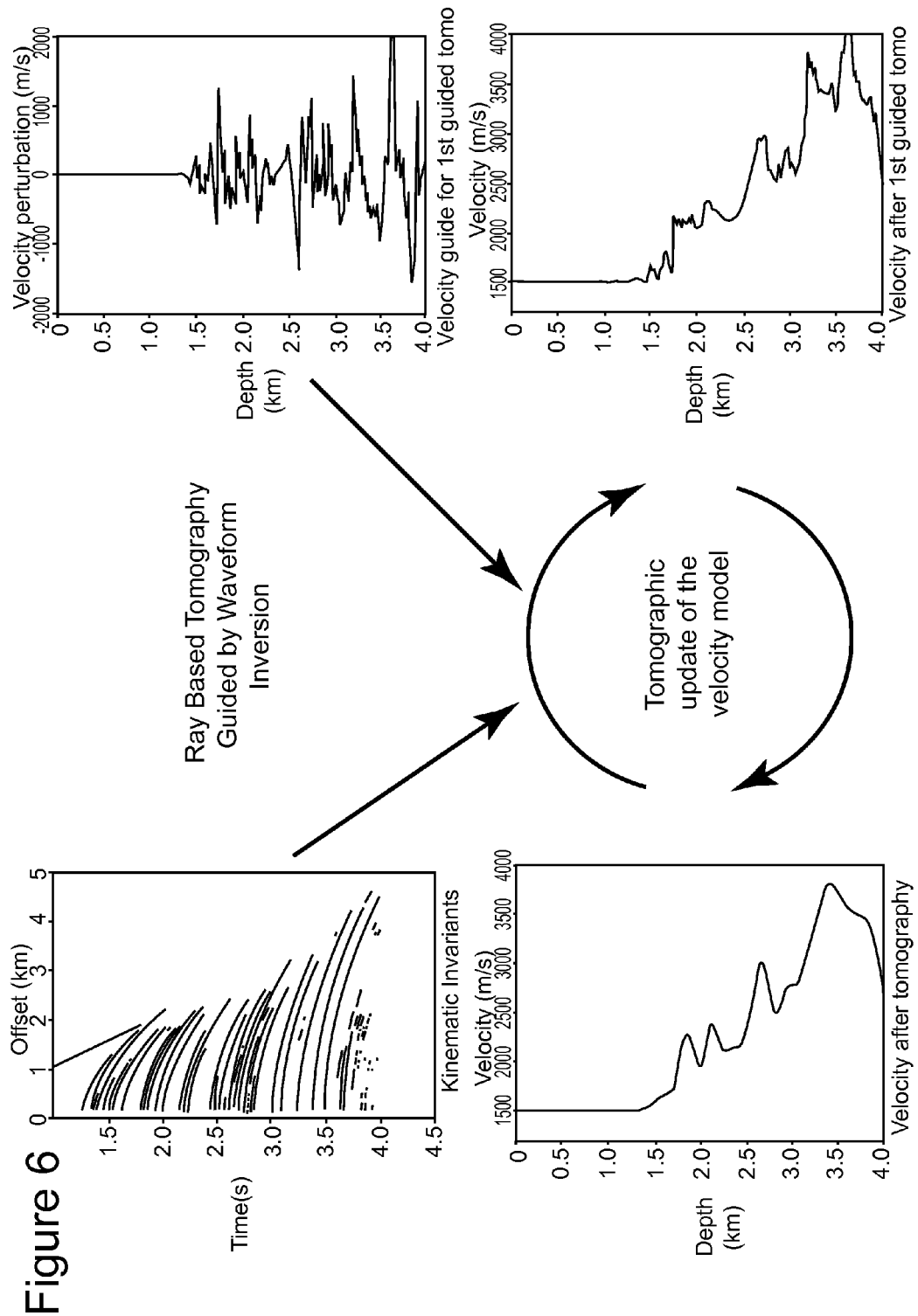
FIG. 6 illustrates a 1D comprehensive view of the method shown in FIG. 5 according to an embodiment.
Figure 7:
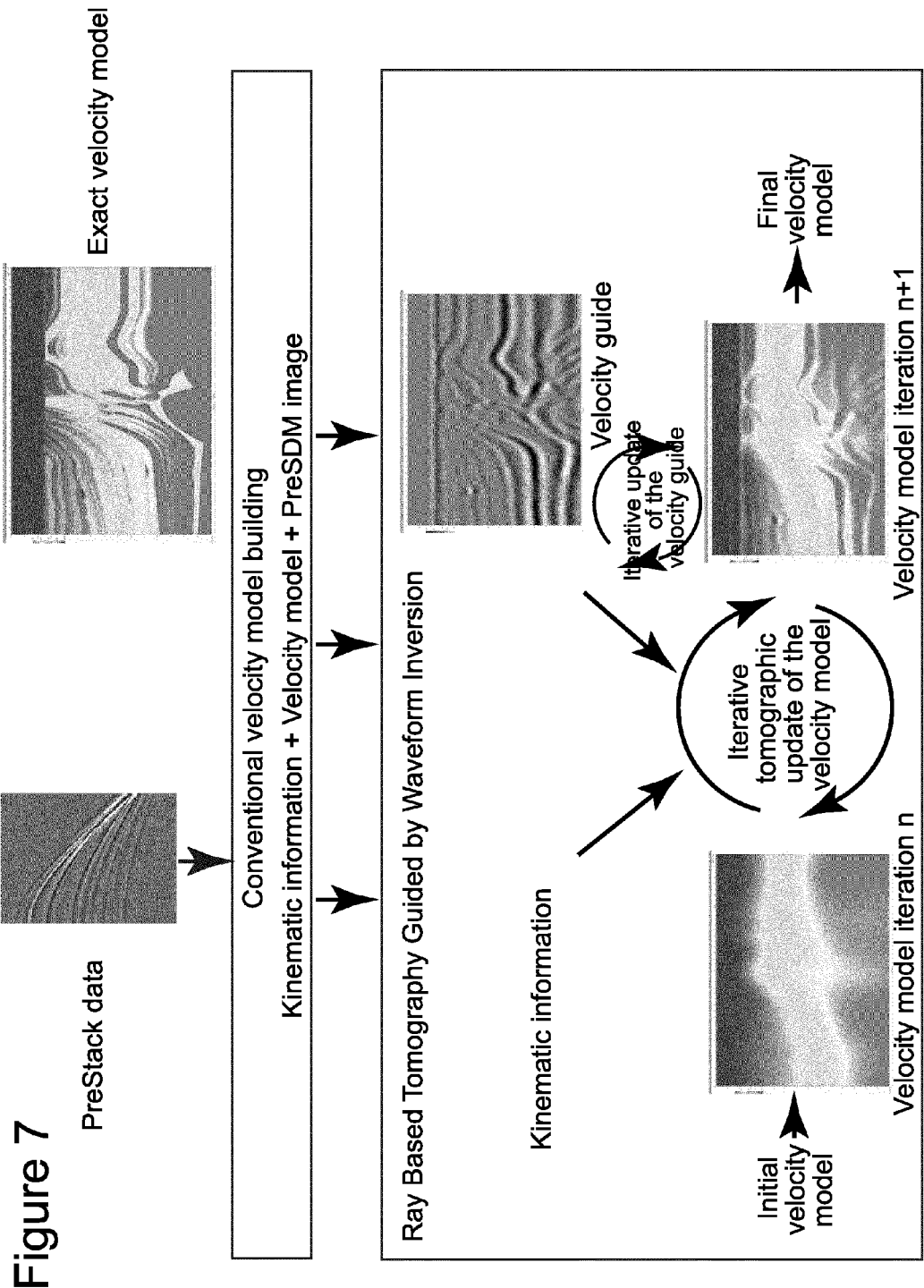
FIG. 7 illustrates 2D comprehensive view of the method shown in FIG. 5 according to an embodiment.

As those of skill in the art can appreciate, applying full waveform inversion using conventional means is a difficult challenge due to the instability of the process (see, Plessix, R. E., et al., 2010, "Application of Acoustic Full Waveform Inversion to a Low-Frequency Large-Offset Land Data Set," SEG expanded abstract, 930-933). According to the embodiments disclosed herein, the systems and methods thus described will provide tremendous improvements to FWI (stability+use of reflected arrivals) but also to ray based tomography (higher resolution). According to a further embodiment, the systems and methods described herein will be particularly useful when applied to broadband data. According to still further embodiments, when implemented in field systems, the systems and methods can make use of and be based on existing PreSDM software codes, wherein modification would include only those to obtain preserved amplitude velocity perturbations rather than reflectivity, and well as to existing tomography codes (modified to allow non-linear stretch of the velocity perturbation). As a result, according to embodiment, the implementation of the systems and methods described herein can be accomplished readily. Still further according to an embodiment, the system and methods described herein will allow optimal advantage of existing workflows for depth imaging and velocity model building. Further, as those of skill in the art can appreciate, method 500 can be utilized in a 1D approach and a 2D approach; FIG. 6 illustrates a 1D comprehensive view of the method shown in FIG. 5 according to an embodiment, and FIG. 7 illustrates 2D comprehensive view of the method shown in FIG. 5 according to an embodiment.

Figure 8:
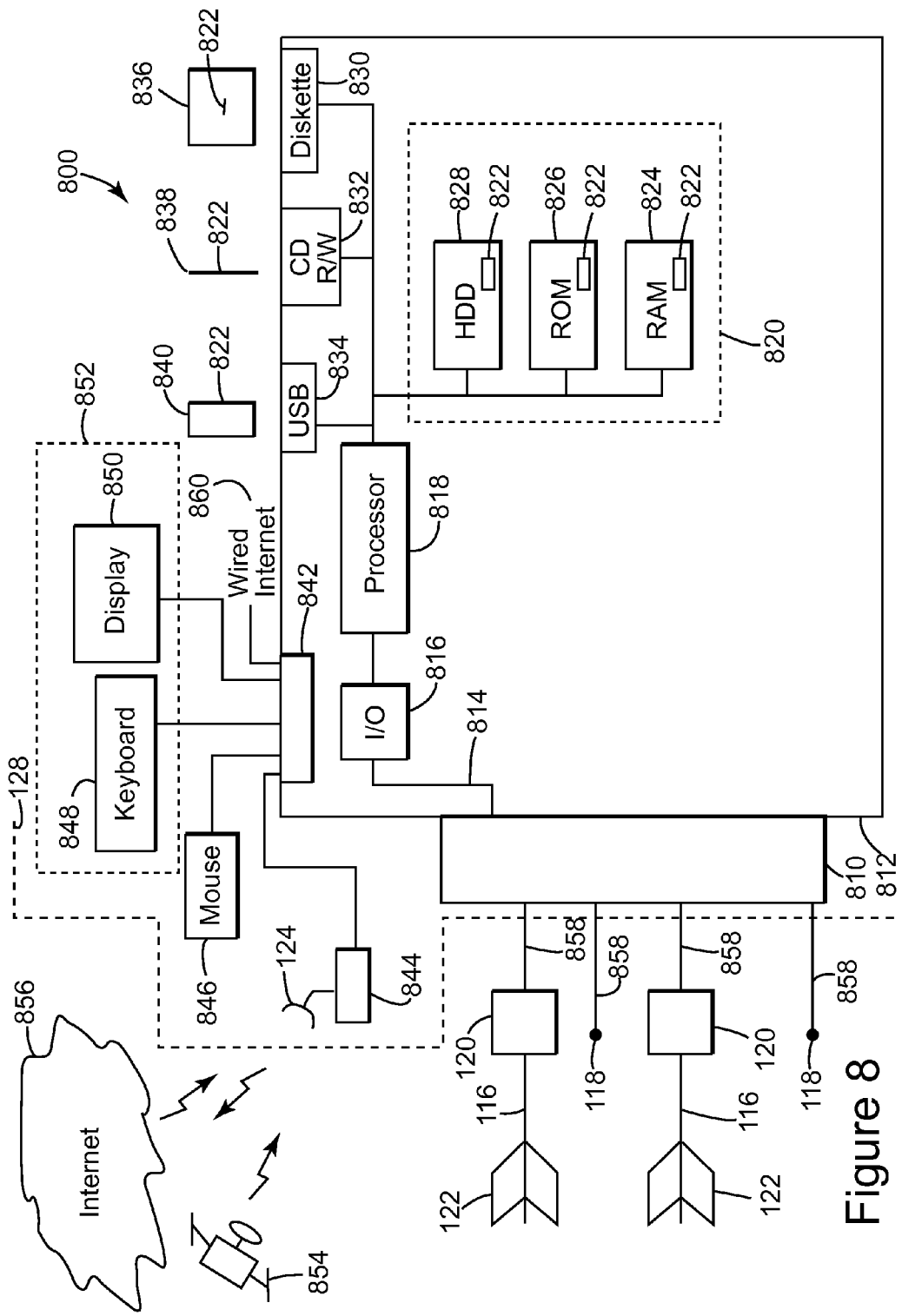
FIG. 8 illustrates a marine seismic data acquisition system suitable for use to implement a method for determining a ray based tomography velocity model using iterated depth migrations to adjust the velocity model according to an embodiment.

FIG. 8 illustrates marine seismic data collection system 800 suitable for use to implement method 500 for generation of high resolution ray based tomography velocity model according to an embodiment. A similar system can be used for land seismic acquisition as well. Marine seismic data collection system 800 includes, among other items, server 812, source/receiver interface 810, internal data/communications bus (bus) 814, processor(s) 818 (those of ordinary skill in the art can appreciate that in modem server systems, parallel processing is becoming increasingly prevalent, and whereas a single processor would have been used in the past to implement many or at least several functions, it is more common currently to have a single dedicated processor for certain functions (e.g., digital signal processors) and therefore could be several processors, acting in serial and/or parallel, as required by the specific application), universal serial bus (USB) port 834, compact disk (CD)/digital video disk (DVD) read/write (R/W) drive 832, floppy diskette drive 830 (though less used currently, many servers still include this device), and data storage unit 820.

Data storage unit 820 itself can comprise hard disk drive (HDD) 828 (these can include conventional magnetic storage media, but, as is becoming increasingly more prevalent, can include flash drive-type mass storage devices 840, among other types), ROM device(s) 826 (these can include electrically erasable (EE) programmable ROM (EEPROM) devices, ultra-violet erasable PROM devices (UVPROMs), among other types), and random access memory (RAM) devices 824. Usable with USB port 834 is flash drive device 840, and usable with CD/DVD R/W device 832 are CD/DVD disks 838 (which can be both read and write-able). Usable with diskette drive device 830 are floppy diskettes 836. Each of the memory storage devices, or the memory storage media (824, 826, 828, 836, 838, and 840, among other types), can contain parts or components, or in its entirety, executable software programming code (software) 822 that can implement part or all of the portions of the method described herein. Further, processor 818 itself can contain one or different types of memory storage devices (most probably, but not in a limiting manner, RAM memory storage media 824) that can store all or some of the components of software 822.

In addition to the above described components, marine seismic data acquisition system 800 also comprises user console 852, which can include keyboard 848, display 850, and mouse 846. All of these components are known to those of ordinary skill in the art, and this description includes all known and future variants of these types of devices. Display 850 can be any type of known display or presentation screen, such as liquid crystal displays (LCDs), light emitting diode displays (LEDs), plasma displays, cathode ray tubes (CRTs), among others. User console 852 can include one or more user interface mechanisms such as a mouse, keyboard, microphone, touch pad, touch screen, voice-recognition system, among other inter-active inter-communicative devices.

User console 852, and its components if separately provided, interface with server 812 via server input/output (I/O) interface 842, which can be an RS232, Ethernet, USB or other type of communications port, or can include all or some of these, and further includes any other type of communications means, presently known or further developed. Marine seismic data acquisition system 800 can further include communications satellite/global positioning system (GPS) transceiver device 844 (to receive signals from GPS satellites 854), to which is electrically connected at least one antenna 124 (according to an embodiment, there would be at least one GPS receive-only antenna, and at least one separate satellite bi-directional communications antenna). Marine seismic data acquisition system 800 can access internet 856, either through a hard wired connection, via I/O interface 842 directly, or wirelessly via antenna 124, and transceiver 844.

Server 812 can be coupled to other computing devices, such as those that operate or control the equipment of ship 102, via one or more networks. Server 812 can be part of a larger network configuration as in a global area network (GAN) (e.g., internet 856), which ultimately allows connection to various landlines.

According to a further embodiment, marine seismic data acquisition system 800, being designed for use in seismic exploration, will interface with one or more sources 118 and one or more receivers 120. These, as previously described, are attached to streamers 116 to which are also attached birds 122 that are useful to maintain positioning. As further previously discussed, sources 118 and receivers 120 can communicate with server 812 either through an electrical cable that is part of streamer 116, or via a wireless system that can communicate via antenna 124 and transceiver 844 (collectively described as communications conduit 858).

According to further embodiments, user console 852 provides a means for personnel to enter commands and configuration into marine seismic data recording/processing system 128 (e.g., via a keyboard, buttons, switches, touch screen and/or joy stick). Display device 850 can be used to show: streamer 116 position; visual representations of acquired data; source 118 and receiver 120 status information; survey information; and other information important to the seismic data acquisition process. Source and receiver interface unit 810 can receive the hydrophone seismic data from receiver 120 though streamer communication conduit 858 (discussed above) that can be part of streamer 116, as well as streamer 116 position information from birds 122; the link is bi-directional so that commands can also be sent to birds 122 to maintain proper streamer positioning. Source and receiver interface unit 810 can also communicate bi-directionally with sources 118 through the streamer communication conduit 858 that can be part of streamer 116. Excitation signals, control signals, output signals and status information related to source 118 can be exchanged by streamer communication conduit 858 between marine seismic data acquisition system 800 and source 118.

Bus 814 allows a data pathway for items such as: the transfer and storage of data that originate from either the source sensors or streamer receivers; for processor 818 to access stored data contained in data storage unit memory 820; for processor 818 to send information for visual display to display 852; or for the user to send commands to system operating programs/software 822 that might reside in either the processor 818 or the source and receiver interface unit 810.

Marine seismic data collection system 800 can be used to implement method 500 for generation of high resolution ray based tomography velocity model according to an embodiment. Hardware, firmware, software or a combination thereof may be used to perform the various steps and operations described herein. According to an embodiment, software 822 for carrying out the above discussed steps can be stored and distributed on multi-media storage devices such as devices 824, 826, 828, 830, 832, and/or 834 (described above) or other form of media capable of portably storing information (e.g., universal serial bus (USB) flash drive 822). These storage media may be inserted into, and read by, devices such as the CD-ROM drive 832, disk drives 830, 828, among other types of software storage devices.

It should be noted in the embodiments described herein that these techniques can be applied in either an "offline", e.g., at a land-based data processing center or an "online" manner, i.e., in near real time while on-board the seismic vessel. For example, data processing including generation of high resolution ray based tomography velocity model according to method 500 can occur as the seismic data is recorded on-board seismic vessel 102. In this case, it is possible for generation of high resolution ray based tomography velocity model according to method 500 data to be generated as a measure of the quality of the sampling run.

As also will be appreciated by one skilled in the art, the various functional aspects of the embodiments may be embodied in a wireless communication device, a telecommunication network, as a method or in a computer program product. Accordingly, the embodiments may take the form of an entirely hardware embodiment or an embodiment combining hardware and software aspects. Further, the embodiments may take the form of a computer program product stored on a computer-readable storage medium having computer-readable instructions embodied in the medium. Any suitable computer-readable medium may be utilized, including hard disks, CD-ROMs, digital versatile discs (DVDs), optical storage devices, or magnetic storage devices such a floppy disk or magnetic tape. Other non-limiting examples of computer-readable media include flash-type memories or other known types of memories.

Further, those of ordinary skill in the art in the field of the embodiments can appreciate that such functionality can be designed into various types of circuitry, including, but not limited to field programmable gate array structures (FPGAs), application specific integrated circuitry (ASICs), microprocessor based systems, among other types. A detailed discussion of the various types of physical circuit implementations does not substantively aid in an understanding of the embodiments, and as such has been omitted for the dual purposes of brevity and clarity. However, as well known to those of ordinary skill in the art, the systems and methods discussed herein can be implemented as discussed, and can further include programmable devices.

Such programmable devices and/or other types of circuitry as previously discussed can include a processing unit, a system memory, and a system bus that couples various system components including the system memory to the processing unit. The system bus can be any of several types of bus structures including a memory bus or memory controller, a peripheral bus, and a local bus using any of a variety of bus architectures. Furthermore, various types of computer readable media can be used to store programmable instructions. Computer readable media can be any available media that can be accessed by the processing unit. By way of example, and not limitation, computer readable media can comprise computer storage media and communication media. Computer storage media includes volatile and non-volatile as well as removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by the processing unit. Communication media can embody computer readable instructions, data structures, program modules or other data in a modulated data signal such as a carrier wave or other transport mechanism and can include any suitable information delivery media.

The system memory can include computer storage media in the form of volatile and/or non-volatile memory such as read only memory (ROM) and/or random access memory (RAM). A basic input/output system (BIOS), containing the basic routines that help to transfer information between elements connected to and between the processor, such as during start-up, can be stored in memory. The memory can also contain data and/or program modules that are immediately accessible to and/or presently being operated on by the processing unit. By way of non-limiting example, the memory can also include an operating system, application programs, other program modules, and program data.

The processor can also include other removable/non-removable and volatile/non-volatile computer storage media. For example, the processor can access a hard disk drive that reads from or writes to non-removable, non-volatile magnetic media, a magnetic disk drive that reads from or writes to a removable, non-volatile magnetic disk, and/or an optical disk drive that reads from or writes to a removable, non-volatile optical disk, such as a CD-ROM or other optical media. Other removable/non-removable, volatile/non-volatile computer storage media that can be used in the operating environment include, but are not limited to, magnetic tape cassettes, flash memory cards, digital versatile disks, digital video tape, solid state RAM, solid state ROM and the like. A hard disk drive can be connected to the system bus through a non-removable memory interface such as an interface, and a magnetic disk drive or optical disk drive can be connected to the system bus by a removable memory interface, such as an interface.

The embodiments discussed herein can also be embodied as computer-readable codes on a computer-readable medium. The computer-readable medium can include a computer-readable recording medium and a computer-readable transmission medium. The computer-readable recording medium is any data storage device that can store data which can be thereafter read by a computer system. Examples of the computer-readable recording medium include read-only memory (ROM), random-access memory (RAM), CD-ROMs and generally optical data storage devices, magnetic tapes, flash drives, and floppy disks. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to, when implemented in suitable electronic hardware, accomplish or support exercising certain elements of the appended claims can be readily construed by programmers skilled in the art to which the embodiments pertains.

The disclosed embodiments provide a source array, computer software, and method for generation of high resolution ray based tomography velocity model. It should be understood that this description is not intended to limit the embodiments. On the contrary, the embodiments are intended to cover alternatives, modifications, and equivalents, which are included in the spirit and scope of the embodiments as defined by the appended claims. Further, in the detailed description of the embodiments, numerous specific details are set forth to provide a comprehensive understanding of the claimed embodiments. However, one skilled in the art would understand that various embodiments may be practiced without such specific details.

Although the features and elements of the embodiments are described in the embodiments in particular combinations, each feature or element can be used alone, without the other features and elements of the embodiments, or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

The above-described embodiments are intended to be illustrative in all respects, rather than restrictive, of the embodiments. Thus the embodiments are capable of many variations in detailed implementation that can be derived from the description contained herein by a person skilled in the art. No element, act, or instruction used in the description of the present application should be construed as critical or essential to the embodiments unless explicitly described as such. Also, as used herein, the article "a" is intended to include one or more items.

All United States patents and applications, foreign patents, and publications discussed above are hereby incorporated herein by reference in their entireties.

We claim:

1. A method for building a velocity model for a geographical area of interest (GAI), comprising:
    determining a ray based tomography velocity image of said GAI using seismic data acquired by sensors and corresponding to at least one of direct and reflected seismic waves emerging from the GAI;
    determining a high resolution velocity guide (HRVG) image of said GAI;
    scaling said determined HRVG image of said GAI;
    adding the scaled HRVG image to the ray based tomography velocity image to determine an updated ray based tomography velocity image; and
    determining whether said updated ray based tomography velocity image has experienced convergence by determining whether a cost function of said ray based tomography velocity image does not improve compared to a previously determined cost function value of said ray based tomography velocity image.

2. The method according to claim 1, wherein the step of determining the HRVG image comprises:

using one of a final or intermediate result of full waveform inversion method, a final or intermediate result from linearized seismic inversion method, and a final or intermediate result from a pre-stack depth migration (PreSDM) following correction of reflectivity-to-velocity perturbation method.

3. The method according to claim 2, wherein the step of using a final or intermediate result of full waveform inversion (FWI) comprises:
determining an initial FWI HRVG;
iteratively correcting the initial FWI HRVG using a gradient method, wherein correlation occurs between a forward propagation of actual sources and reverse-time propagation of residuals occurs; and
additionally forward-propagating the actual sources and computing a final FWI HRVG along a conjugate-gradient direction.

4. The method according to claim 1, wherein the step of scaling comprises:
improving a cost function of the ray based tomography velocity image data.

5. The method according to claim 4, wherein scaling is applied on an automated basis.

6. The method according to claim 1, wherein convergence of the updated ray based tomography velocity image data has occurred when pre-stack depth migrated images have been focused.

7. The method according to claim 1, further comprising:
performing any one of a low-pass filtering, muting and applying of offset ranges to said acquired data.

8. The method according to claim 7, wherein said performing step occurs prior to said step of determining an HRVG image.

9. The method according to claim 1, further comprising:
determining an alternative velocity model wherein high frequency components are substantially preserved.

10. The method according to claim 1, further comprising:
recovering long wavelength components of said ray based tomography velocity image.

11. The method according to claim 10, wherein said long wavelength components of said ray based tomography velocity image are recovered by artificially adding certain long wavelength components.

12. A method for building a velocity model for a geographical area of interest (GAI), comprising:
guiding a ray-based tomography method to build the velocity model of the GAI by high resolution velocity perturbations (HRVPs), wherein said HRVPs are derived from at least one of a depth migration process and a full waveform inversion process applied to seismic data acquired by sensors and corresponding to at least one of direct and reflected seismic waves emerging from the GAI, and wherein said velocity model is a focused ray based tomography velocity model.

13. The method according to claim 12, wherein said HRVPs are derived from said depth migration process, and there is an overlap between a first set of wavelengths resolved from said ray based tomography process and a second set of wavelengths resolved from said depth migration process.

14. The method according to claim 13, wherein said guiding step is performed for shallow water areas.

15. A non-transitory computer readable medium of instructions for building a velocity model for a geographical area of interest (GAI), comprising:
a first set of instructions configured to use seismic data acquired by sensors and corresponding to at least one of direct and reflected seismic waves emerging from the GAI to build a first velocity model of the GAI using a ray based tomography method; and
a second set of instructions configured to adjust the velocity model of the GAI using high resolution velocity perturbations to obtain a focused ray based tomography velocity model.

16. The non-transitory computer readable medium of instructions according to claim 15, wherein the high resolution velocity perturbations are derived from at least one of depth migration and full waveform inversion.

17. The non-transitory computer readable medium of instructions according to claim 16, wherein said acquired data comprises broadband data.

18. The non-transitory computer readable medium of instructions according to claim 17, wherein a vertical resolution bandwidth of said acquired broadband data is about 6 Hz.

19. The non-transitory computer readable medium of instructions according to claim 17, wherein said broadband data includes data with frequencies at or about 2½ Hz.

20. The non-transitory computer readable medium of instructions according to claim 15, wherein
said first set of instructions includes instructions adapted to determine a ray based tomography velocity image of said GAI using acquired data, and determine a high resolution velocity guide (HRVG) image of said GAI, and further wherein said second set of instructions includes instructions adapted to scale said determined HRVG of said GAI, add the scaled HRVG to the ray based tomography velocity image to determine an updated ray based tomography velocity image, and determine whether said updated ray based tomography velocity image has experienced convergence by determining whether a cost function of said ray based tomography velocity image does not improve compared to a previously determined cost function value of said ray based tomography velocity image.

* * * * *